United States Patent [19]
Wertenbach et al.

[11] Patent Number: 5,526,648
[45] Date of Patent: Jun. 18, 1996

[54] SORPTION DEVICE AND METHOD OF OPERATING SAME FOR ELECTRIC DRIVEN VEHICLE AIR CONDITIONING

[75] Inventors: Jürgen Wertenbach, Fellbach; Günter Abersfelder, Sindelfingen, both of Germany

[73] Assignee: Mercedes-Benz AG, Stuttgart, Germany

[21] Appl. No.: 322,761

[22] Filed: Oct. 13, 1994

[30] Foreign Application Priority Data

Oct. 13, 1993 [DE] Germany .......................... 43 34 808.4

[51] Int. Cl.⁶ .............................. F25B 17/00; F25B 29/00
[52] U.S. Cl. ................................ 62/101; 62/239; 62/477; 62/480; 165/104.12
[58] Field of Search ........................... 62/101, 103, 106, 62/239, 244, 476, 477, 480, 481, 238.3; 165/104.12, 42, 58

[56] References Cited

U.S. PATENT DOCUMENTS

| | | | |
|---|---|---|---|
| 1,729,081 | 9/1929 | Miller | 62/480 |
| 4,205,531 | 6/1980 | Brunberg et al. | 62/101 |
| 4,307,575 | 12/1981 | Popinski | 62/148 |
| 4,759,191 | 7/1988 | Thomas et al. | 62/101 |
| 5,388,423 | 2/1995 | Khelifa | 62/238.3 |
| 5,404,728 | 4/1995 | Maier-Laxhuber | 62/106 |

FOREIGN PATENT DOCUMENTS 4126960  2/1993  Germany.

*Primary Examiner*—Henry A. Bennett
*Assistant Examiner*—William Doerrler
*Attorney, Agent, or Firm*—Evenson, McKeown, Edwards & Lenahan

[57] ABSTRACT

The invention relates to a sorption method for air-conditioning vehicles, especially electric vehicles, and a device for working the method. To achieve rapid cooling or heating by means of vehicle air conditioning while achieving improved manufacturing, cost, and weight advantages, it is proposed that the sorption unit, composed of a storage container with sorbent, a supply container with sorbate, and a steam duct connecting the containers with one another, is evacuated only to perform an adsorption process employing a vacuum pump and is vented for desorption. The sorbent located in the storage container is traversed by hot air for desorption, said air, moistened with sorbate after passing through, being vented to the environment past the supply container after flowing through a vent line that branches off the steam duct.

20 Claims, 1 Drawing Sheet

SORPTION DEVICE AND METHOD OF OPERATING SAME FOR ELECTRIC DRIVEN VEHICLE AIR CONDITIONING

BACKGROUND AND SUMMARY OF THE INVENTION

The invention relates to an apparatus and a method for operating a sorption system for air-conditioning vehicles, especially electric vehicles. More specifically, the invention relates to a sorption system of the type containing a storage container for a sorbent and a supply container for a sorbate connected with the storage container by a connecting line that can be shut off, in which the sorbent is desorbed in the charging phase by the addition of heat adsorbed from sorbate, and sorbate vapor is adsorbed on the sorbent in the discharge phase, and optionally the heat of adsorption that is released in the sorbent or the heat of evaporation released in the sorbate are used. The invention also relates to a sorption system of the type including a thermally insulated vacuum-tight supply container with sorbate, at least one vacuum-tight storage container containing a sorbent that is thermally insulated, a connecting duct that can be shut off and connects the two containers with one another, and a heater that can be used for desorption and has heat exchange surfaces, one of which is in contact with the sorbate and the other with a sorbent.

A sorption system of these general types are known from DE-OS 41 26 960. The sorption system described therein operates permanently in a vacuum, with the system being evacuated once when manufactured and then being sealed tight for a long time. This requires comprehensive vacuum technology whose elements are expensive and heavy because of the requirements for providing a long-term seal. In the desorption phase, the sorbent is heated electrically. Because of the low thermal conductivity of the sorbent and the small contact area between the heating coil and the porous sorbent, complete desorption of the sorbate from the sorbent and hence the regeneration of the sorption system lasts a very long time. Because of the requirements of the process, the hot gaseous desorbed sorbate is conducted through the steam duct to the supply container containing sorbate cooled in a previous adsorption phase, on whose walls the sorbate then condenses, giving off condensation heat. The amount of heat released is transferred at least partially to the cooled sorbate and heats it, resulting in a loss of heat by cooling when the vehicle interior has a cooling requirement. Moreover, the adsorption rate and hence the air conditioning are mainly controlled by the steam channel being closed to a greater or lesser degree by regulating a shutoff valve located in the steam duct. However, this kind of regulation is relatively costly for controlling the adsorption rate, because mechanical parts must be moved in a vacuum and also wear with frequent use. In addition, a change in the steam channel cross section while the sorbate vapor is passing through constitutes a noise source that adversely affects riding comfort.

An object of the invention is to improve the apparatus and method of the type referred to above in such fashion that rapid cooling or heating can be achieved with vehicle air conditioning and that no manufacturing, weight, or cost disadvantages need to be taken into account; indeed, improvements are made if possible in this regard.

This object is achieved according to the invention by providing an arrangement wherein the sorption unit, composed of a storage container with sorbent, a supply container with sorbate, and a steam duct connecting the containers with one another, is evacuated only to perform an adsorption process employing a vacuum pump and is vented for desorption. The sorbent located in the storage container is traversed by hot air for desorption, said air, moistened with sorbate after passing through, being vented to the environment past the supply container after flowing through a vent line that branches off the steam duct.

By virtue of the invention, as a consequence of hot air flowing through the sorbent that passes completely through the sorbent and comes in direct contact with the sorbate practically everywhere in the sorbent, the- heat transfer to the stored sorbent, and to the sorbate, is considerably increased and hence desorption is accelerated very sharply. Discharging the hot air loaded with sorbate into the open air without pressurizing the sorbate means that the cooled sorbate is not heated and can therefore be cooled even further during the subsequent adsorption process. As a result, more cooling energy is provided by comparison with conventional sorption systems for air conditioning systems, and is accomplished faster and with only a short regeneration phase required for the sorbent.

On the whole, the invention ensures an acceleration of the sorption process, so that heat and cold are available more rapidly for air conditioning. It is not necessary in this regard to keep the sorption unit evacuated during the entire sorption process, so that the individual elements of the sorption unit do not have to be made tight for the long term to hold a vacuum. This permits simple manufacture of the components, and structurally expensive feedthroughs in the vacuum containers can be omitted. Because of the reduced quality requirements regarding vacuum tightness for the components, thinner walls can be used and materials with lower vacuum quality can be used, making the sorption unit lighter and less expensive.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
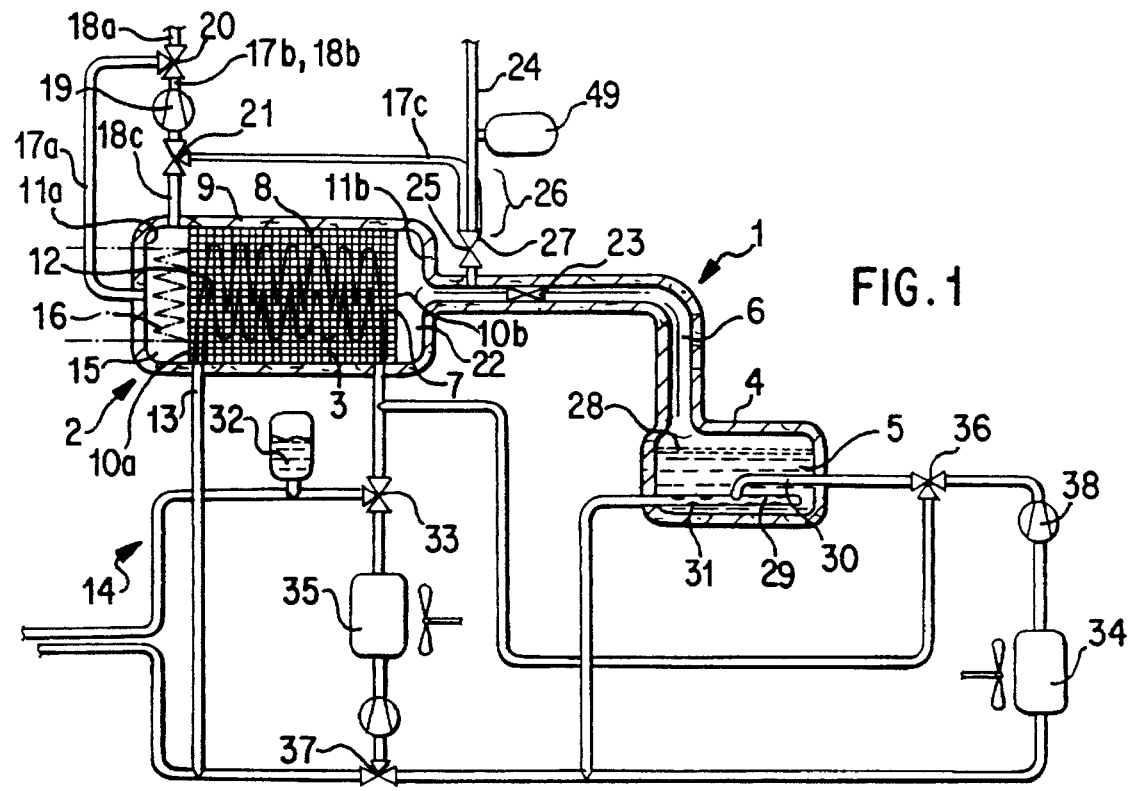
FIG. 1 is a schematic diagram of a heat exchanger circuit with the device according to the invention, with a storage container containing a sorbent.

In FIG. 1 a sorption unit 1 for air-conditioning electric vehicles is shown, composed of a storage container 2, in the shape of a rectangular parallelapiped for example, with a sorbent 3 made of a solid material, a supply container 4 containing liquid sorbate, and a connecting duct 6 linking storage container 2 with supply container 4 fluidically. Sorption unit 1 is thermally insulated.

The porous sorbent 3 consists of a loose charge of zeolite and is held inside storage container 2 in a fine-mesh wire cage 7. Sorbent 3 likewise forms a rectangular parallelapiped, whose periphery in wire cage 7 abuts the inside walls 8 of storage container jacket 9 and whose ends 10a, b, lying transversely with respect to its lengthwise dimension, are set back from the inside walls 11a, b, of storage container 2 which are parallel and located opposite. A heat exchanger 12 is provided in sorbent 3 over nearly its entire length, said exchanger being formed by a coiled section of a pipe 13 that passes through storage container 2. Pipe 13 is connected to a system of pipes 14 forming the heat exchanger circuit. The end 10a of sorbent 3 abutting the end away from the connecting duct, together with the inside walls 11a of storage container 2, delimits a heating chamber 15, into which a heating coil 16 of an electrical heater projects. A vent line 17 for supplying air and an evacuating line 18 for removing air terminate in heating chamber 15, with the two lines 17, 18 each being divided into three line sections a, b, c. Both lines 17 and 18 are connected with the atmosphere through a vacuum pump 19, which, depending on the positions of regulating valves 20 and 21, supply air to or remove it from heating chamber 15.

At the end facing the connecting duct, sorbent 3 with its end 10b at this location together with inside walls 11b of storage container 2 delimit a steam chamber 22 to which connecting duct 6 connects. A steam trap in the form of a regulating valve 23 is provided in connecting duct 6, by means of which valve 23, storage container 2 and supply container 4 can be separated from one another fluidically to ensure that sorbent 3 can be isolated reactively from sorbate 5. Between steam chamber 22 and regulating valve 23 a vent line 24 branches off connecting duct 6, said vent line 24 being closable vacuum-tight by a regulating valve 25. Downstream from regulating valve 25, vent line 24 has a condensation heat exchanger 26 connected with a condensate reservoir 49. The condensate heat exchanger 26 is formed by vent line 24 and the end of vent line section 17c that projects from line section 17C and leads to the outside.

Supply container 4 contains water as a sorbate 5, but brine can be preferably used as well. In addition, a demister 28 is provided in supply container 4 above the sorbate level. A pipe 29 forming a heat exchanger passes through supply container 4 in the vicinity of the bottom, said pipe 29 having inlet openings 30 on the inlet side and outlet openings 31 on the outlet side in the supply container, and connectable to pipe system 14.

In the discharged state of sorption unit 1, sorbent 3 is saturated with sorbate 5. This is the sorbate 5, evaporated during sorption on the sorbent in this volume, and liquefied again.

To charge sorption unit 1, air is conveyed at approximately atmospheric pressure into heating chamber 15 through vent line sections 17c, b, a, by means of vacuum pump 19, with regulating valve 20 closing evacuation line section 18a and with regulating valve 21 closing evacuating line section 18c. Section 18b of the evacuation line corresponds only materially to section 17b of the vent line.

The electrical circuit for electrical heat is closed, whereupon heating coil 16 in heating chamber 15 heats the air supplied to it. The hot air then passes through sorbent 3 and, by virtue of its heat transfer, desorbs the sorbate bonded to the sorbent. Heat exchanger 12 located in sorbent 3 is decoupled fluidically beforehand and the volume of brine that normally flows through it is received in an intermediate reservoir 32. This decoupling of sorbent 3 from line system 14 avoids transferring heat into the heat exchanger circuit and thus the sorbent is heated especially effectively by the hot air.

After passing through sorbent 3, the hot air laden with sorbate passes through steam chamber 22 into connecting duct 6. Regulating valve 23 is set so that it shuts off supply container 4 from storage container 2. Regulating valve 25 is opened at the same time so that the hot, moist air flows through connecting duct 6 into vent line 24. The air then passes through condensation heat exchanger 26. In the latter, the sorbate contained in the hot air condenses, so that the resultant heat of condensation is transferred through the vent line walls, jacketed by vent line section 17c, by heat conduction to the air drawn in at its end 27. As a result, preheated air enters heating chamber 15, resulting in a reduction of electrical heating power. The condensed sorbate is conducted into the condensate reservoir 49. The hot air which is now dry escapes downstream from condensation heat exchanger 26 into the open air. This prevents the warm condensate and the hot air from being supplied to supply container 4 and heating sorbate 5, which in the charged state of sorption unit 1 is intended to have a cooling function.

The condensate cools to ambient temperature in the condensate reservoir 49 and can be fed again to supply container 4 with sorption unit 1 in the discharged state,so that sorbate loss in sorption unit 1 is reduced. In a compact variation on this, the hot, moist air can also be blown out into the open without previous condensation of the sorbate, but this forces the vehicle operator to fill the supply container at regular intervals to maintain the function of the sorption system.

The desorption process described above is performed until the sorbent is mostly dry and has acquired its maximum possible adsorption capacity. Then regulating valve 25 closes vent line 24, regulating valve 21 closes section 17c, and regulating valve 20 closes section 17a of vent line 17. The power supply to heating coil 16 is interrupted, whereupon regulating valves 20 and 21 open sections 18a and 18c of the vent line. Vacuum pump 19 then constitutes a vacuum source and evacuates storage container 2.

A regulating valve 33 provided in line system 14 opens the line to intermediate reservoir 32 to heat exchanger 12, so that brine flows via pipe 13 through heat exchanger 12. Finally, regulating valve 23 of connecting duct 6 opens, so that a vacuum develops throughout the entire adsorption unit, causing a drop in the vapor pressure in sorbate 5 and initiating the discharge phase of the sorption system.

As a result, a portion of the volume of sorbate 5 is abruptly evacuated and is sucked through connecting duct 6 into steam chamber 22, in which the vapor flow widens out and consequently strikes the entire end 10b of the sorbent uniformly, then flows through the latter.

The steam is adsorbed by sorbent 3, which by virtue of its change of state from gaseous to liquid and the gain of bonding energy, releases adsorption heat that is decoupled through the heat exchanger and pipe 13 into the heat exchanger circuit and then is available through an air-water heat exchanger 34 to heat a passenger compartment, or is simply discharged into the environment through an air-water heat exchanger 35.

The heat of evaporation that results from evaporation of the partial volume of sorbate is drawn from the heat content of sorbate 5, which cools as a result. Since evaporation takes place very quickly, sorbate droplets are entrained by the sorbate vapor. To prevent inefficient adsorption of these droplets, a demister 28 is provided in supply container 4 in which these droplets are separated.

After several operating cycles of desorption and adsorption during the charging operation of sorption unit 1, the latter achieves a state that is optimum for air-conditioning the passenger compartment, in which sorbent 3 is completely dry and sorbate 5 is very cold. Sorbate 5 can be frozen into a block of ice, so that supply container 4 constitutes an ice reservoir which, by drawing heat of fusion from the passenger compartment, can be used to cool the latter. Before the vehicle is driven, storage container 2 is disconnected from supply container 4 by shutting off connecting duct 6 by means of regulating valve 23, in order to avoid undesired adsorption. A vacuum is then created in sorption unit 1 whose pressure value is between that of atmospheric pressure and the vacuum required for adsorption, and which can be maintained in the unit for a long time. As a result, during subsequent driving, the pumping time of vacuum pump 19 required to reach the vacuum required for the adsorption process is considerably reduced, so that cold or heat can be delivered very quickly.

During driving, regulating valve 23 opens connecting duct 6, and the vacuum pump simultaneously generates the vacuum required for adsorption. Sorbate 5 cools off even further while heat of adsorption develops in sorbent 5 that can be used for heating if needed. Thanks to the heat given off by current-conducting vehicle components, especially the exhaust heat from a high-temperature battery possibly installed in the vehicle, sorbent 3 can be at least partially desorbed after complete adsorption, so that the ability to provide air conditioning is considerably prolonged. The coupling of the exhaust heat can be accomplished by preheating the air drawn in during desorption.

To heat the passenger compartment, supply container 4 is decoupled along with cool sorbate 5 by a regulating valve 36 from the heat exchanger circuit, so that only the heat of adsorption fed into the heat exchanger circuit is fed through heat exchanger 34 to the passenger compartment. In addition, the exhaust heat from the vehicle components in the heat exchanger circuit can be used to heat the passenger compartment.

When cooling is required, by suitable switching of regulating valve 36 and another regulating valve 37, the supply of heat to heat exchanger 34 can be interrupted and supply container 4 with its cooled sorbate 5 can be coupled to the heat exchanger. By means of a circulating pump 38, brine at the temperature of the environment is fed in the heat exchanger circuit to cool sorbate 5 through inlet openings 30 in pipe 29, and cold brine is carried away through outlet openings 31, with heat being drawn off through heat exchanger 34 from the passenger compartment and coupled into the circuit.

By regulating the delivery rate of vacuum pump 19 in conjunction with regulating the decoupling of heat from sorbent 3 during adsorption, the adsorption rate for sorbate vapor and hence the heating or cooling power can be controlled very precisely. It is also possible when ambient temperatures are very far below the solidification temperature of the brine, to connect supply container 4 to heat exchanger 12 by suitably switching regulating valve 36, so that sorbate 5 is kept in a liquid state by the adsorption heat and the adsorption process can take place even at very low temperatures.

Finally, a measuring device is provided in the device to measure the level in supply container 4 and the temperature of the sorbate located therein. The need to top up the supply container might possibly be indicated by the measuring device, and the condensate reservoir 49 might possibly be connected fluidically when the condensate is cooled. If there is a threat of the sorbate solidifying, heat z is supplied to the supply container.

Figure 2:
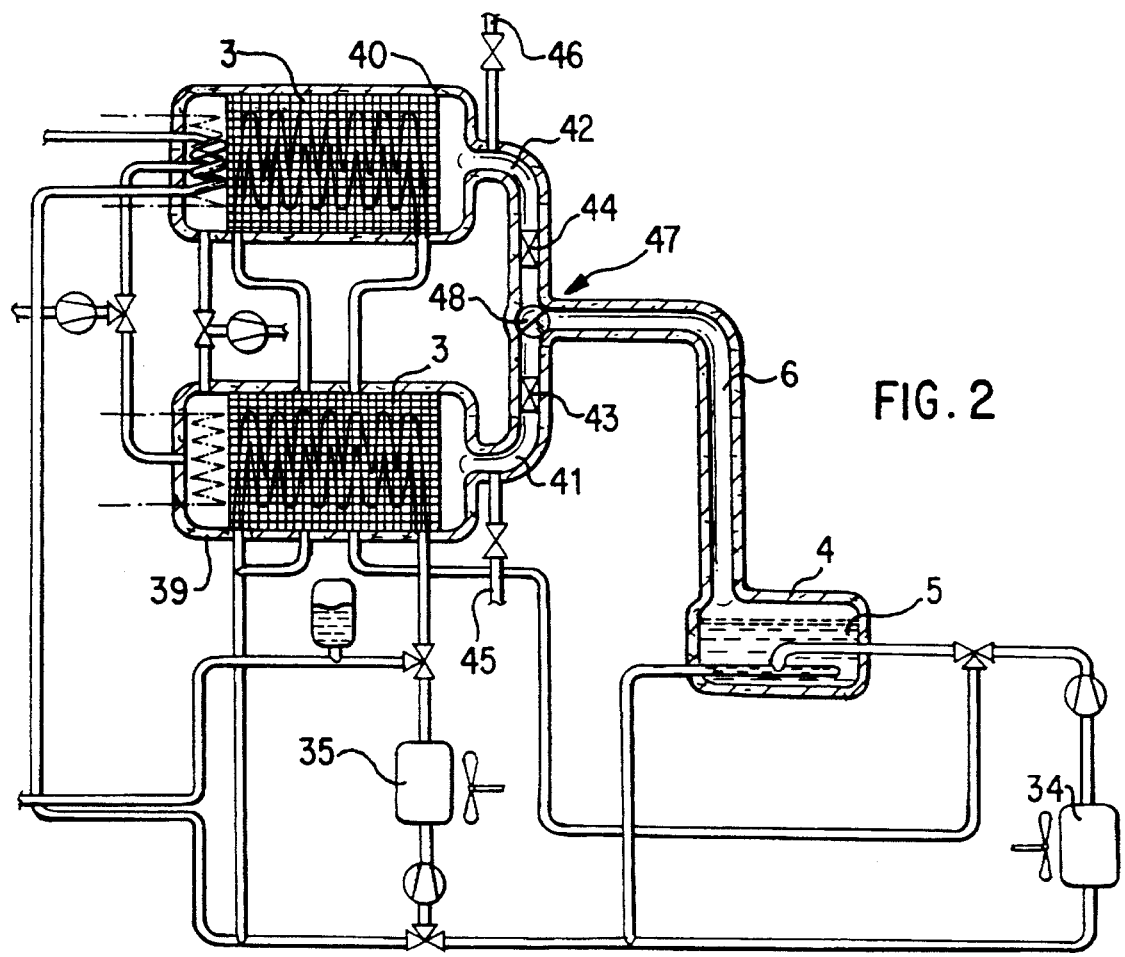
FIG. 2 is a schematic diagram of a heat exchanger circuit containing the device according to the invention, with two storage containers used for adsorption and desorption in parallel.

In contrast to FIG. 1, FIG. 2 shows a sorption unit 1 with two storage containers 39, 40. Connecting duct 6 is divided into two duct arms 41, 42 each with a steam trap in the form of a regulating valve 43, 44 located therein and each having a vent line 45, 46 leading away from it. Duct arm 41 runs to storage container 39 and duct arm 42 runs to storage container 40. Connecting duct 6 has a switching valve 48 at junction 47, which reactively separates the two storage containers 39, 40 from one another to avoid an adsorption process between the sorbents and always shuts off whichever duct arm (duct arm 42 in this case) from supply container 4 leads to a storage container with sorbent charged with sorbate. This means that during driving, the sorbent from one storage container 39 can be adsorbed and the sorbent from the other storage container 40 can be desorbed, for example by the heat of adsorption of the adsorbing sorbent. Consequently, with suitable switching of switching valve 48, shutting off duct arm 41 and opening duct arm 42 when the sorbent in storage container 39 is saturated with sorbant, continuous adsorption by the sorption unit and hence considerably longer air-conditionability of the passenger compartment is achieved. As a result, with an at least comparable if not higher air-conditioning capacity of sorption unit 1, storage containers 39, 40 and sorbent 3 therein can have much smaller volumes than storage container 2 with its sorbent in the embodiment in FIG. 1. It is also possible for the connecting duct to be divided into a number of duct arms that corresponds to the even number of storage containers and with the switching valve being so designed, located, and controlled that half the number of storage containers is always shut off for desorption from the connection with the supply container.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for operating a sorption system for air-conditioning motor vehicles, containing a sorption unit which comprises a storage container for a sorbent and a supply container for a sorbate, said storage container being in fluid communication with the supply container by a closable connecting line, in which the sorbent is desorbed in a charging phase by the addition of heat from the sorbate, and sorbate vapor is adsorbed on the sorbent in a discharge phase, and at least one of heat of adsorption that is released in the sorbent and heat of evaporation that is released in the sorbate is used for heating the motor vehicles, wherein during the charging phase, an air stream is heated and fed directly to the sorbent by forced convection, and desorbed sorbate is carried away from said storage container with the heated air, bypassing the supply container for the sorbate, while said storage container is open to the atmosphere, and wherein during the discharge phase, the sorption unit is evacuated with said unit being shut off from the atmosphere.

2. Method according to claim 1, wherein the desorbed sorbate expelled by the heated air is condensed and the resultant heat of condensation is transferred to the air stream used for desorption, before this air stream is fed to the sorbent.

3. Method according to claim 1, wherein the adsorption rate of the sorbate is controlled by setting the evacuation vacuum.

4. Method according to claim 1, wherein the air stream used for desorption is electrically heated.

5. Method according to claim 1, wherein during driving, the air stream used for desorption is heated by the heat given off by vehicle components, especially a high-temperature battery.

6. Method according to claim 1, wherein sorbate and sorbent are separated fluidically from one another when the vehicle is shut off.

7. Method according to claim 6, wherein the sorption unit is pre-evacuated to a pressure level higher than the vacuum generated for the adsorption process, when the vehicle is shut off.

8. Method according to claim 1, wherein adsorption and desorption are performed simultaneously on different supplies of sorbents, with the sorption treatment of the supplies being changed after one of the supplies is discharged.

9. Method according to claim 8, wherein the heat given off during adsorption of a supply on a sorbent is used for preheating the desorption air for another sorbent supply to be desorbed.

10. Sorption system comprising:
   a thermally insulated vacuum-tight supply container with sorbate,
   at least one vacuum-tight storage container containing a sorbent that is thermally insulated,
   a connecting duct that can be shut off and that connects the two containers with one another, and
   a heater that can be used for desorption and that has heat exchange surfaces, one of which is in contact with the sorbate and the other with a sorbent,
   wherein a first vent line is connected to the storage container, through which first vent line air can be conducted into the storage container for desorbing sorbent that fills the cross section of the storage container,
   wherein a heating device is provided that heats the air before it passes through the sorbent,
   wherein a second vent line that can be closed vacuum-tight is provided on the storage container opposite the sorbent, through which second vent line the sorbate-laden hot air can be conducted away after passing through sorbent, and
   wherein a vacuum pump that can be turned on for adsorption is connected to the sorption unit.

11. Sorption system according to claim 10, wherein the heating device is an electrical heating device.

12. Sorption system according to claim 11, wherein the sorbent is recessed from an inside wall of the storage container at an end facing away from the connecting duct, and delimits with said wall a heating chamber in which the first vent line terminates and in which the electrical heater is provided.

13. Sorption system according to claim 10, wherein the second vent line has a condensation heat exchanger for the sorbate in which cool air can exchange heat with the hot, moist air flowing through the second vent line, and wherein the side of the condensation heat exchanger that conveys cool air is connected with the air at the second vent line that supplies air during desorption.

14. Sorption system according to claim 13, wherein the second vent line is connected with a condensate reservoir that receives the condensate downstream from the condensation heat exchanger.

15. Sorption system according to claim 10, wherein a separator for sorbate that is not evaporated but is entrained during the adsorption of sorbate vapor is located in the supply container.

16. Sorption system according to claim 10, wherein the heat exchanging surfaces in contact with the sorbent or the sorbate are made in the form of container-integral heat exchanger coils that pass through the sorbent or the sorbate.

17. Sorption system according to claim 10, wherein the sorbent is set back from inside a wall of the storage container at its end facing away from the connecting duct.

18. Sorption system according to claim 10, wherein the air stream from a vacuum pump used to evacuate the sorption unit can be generated with the delivery direction reversed.

19. Sorption system according to claim 10, wherein the sorbent is divided into at least two storage containers, with the connecting duct being divided into a number of duct arms that correspond to an even number of storage containers and with a switching valve being disposed in the connecting duct at a junction, and being so designed, located, and controlled that one of the storage containers or half the number of storage containers are shut off from the connection with the supply container for desorption.

20. Method according to claim 1, wherein said heat from the sorbate is heat of condensation of the sorbate.

\* \* \* \* \*